United States Patent [19]

Leeds

[11] E Re. 29,231

[45] Reissued May 24, 1977

[54] COPOLYMER OF HYDROXYALKYL METHACRYLATE AND POLYVINYLPYRROLIDONE

[75] Inventor: Harry R. Leeds, Rochester, N.Y.

[73] Assignee: Patent Structures, Inc., New York, N.Y.

[22] Filed: Nov. 16, 1972

[21] Appl. No.: 307,183

Related U.S. Patent Documents

Reissue of:

[64] Patent No.: 3,621,079
Issued: Nov. 16, 1971
Appl. No.: 769,032
Filed: Oct. 21, 1968

[52] U.S. Cl. ..... 260/885; 128/130; 351/160; 264/1; 424/80

[51] Int. Cl.[2] ..... C08F 21/00; C08F 43/00

[58] Field of Search ..... 260/885; 351/160; 128/130; 424/80

[56] References Cited

UNITED STATES PATENTS

| | | | |
|---|---|---|---|
| 3,220,960 | 11/1965 | Wichterle et al. | 260/2.5 |
| 3,446,875 | 5/1969 | Bruckmann et al. | 260/885 |
| 3,462,385 | 8/1969 | Barabas | 260/29.6 |
| 3,488,111 | 1/1970 | Isen | 351/160 |
| 3,647,736 | 3/1972 | Ewell | 260/885 |

*Primary Examiner*—Richard B. Turer
*Attorney, Agent, or Firm*—Cushman, Darby & Cushman

[57] ABSTRACT

A polymeric plastic material suitable for contact lenses, dental liners and other prosthetic devices, intrauterine devices, and other devices to be used in or in the treatment of the body. It is made from a monomer having the wherein n is 2 or 3, polymerized with polyvinyl pyrrolidone or polyvinyl pyrrolidone/vinyl acetate copolymer. The application also discloses procedures for making contact lenses, dental liners, and intrauterine devices from such polymeric material.

11 Claims, 9 Drawing Figures

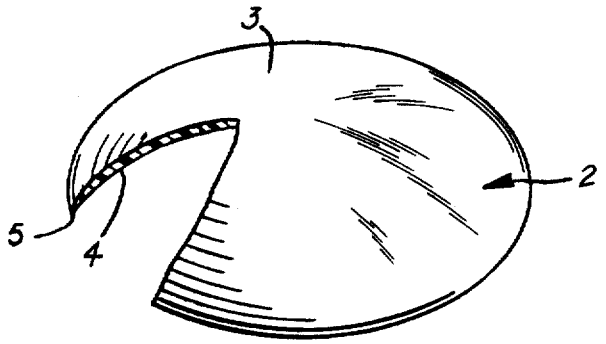
FIG. 1
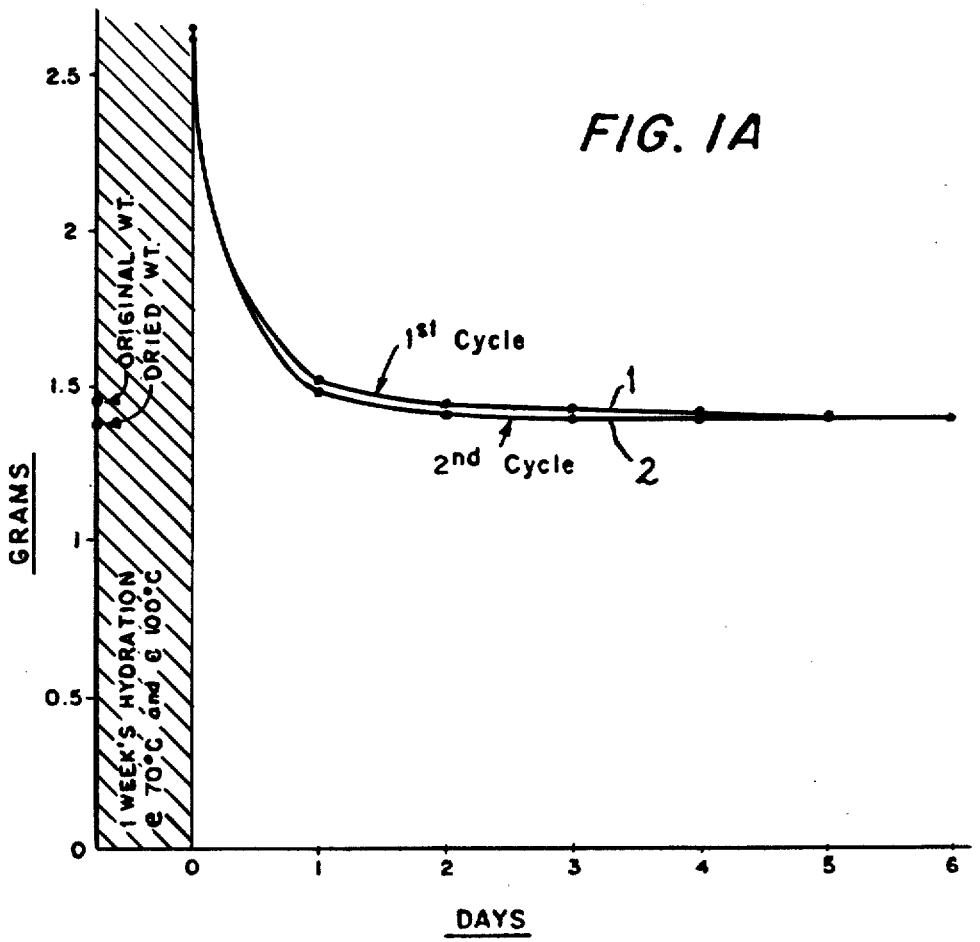

COPOLYMER OF HYDROXYALKYL METHACRYLATE AND POLYVINYLPYRROLIDONE

Matter enclosed in heavy brackets [ ] appears in the original patent but forms no part of this reissue specification; matter printed in italics indicates the additions made by reissue.

Contact lenses ordinarily have a marked tendency to cause partial asphyxiation of the metabolism of the cornea of the eye. This is true for the corneal, as well as the scleral type, even through the former are somewhat smaller and cover only cornea. Such asphyxiation in turn causes irritation of the cornea and has given rise to a significant problem in the use of contact lenses for many individuals.

Contact lenses have conventionally been fabricated of relatively hard plastic materials. The very hardness of the material itself has also caused problems in the use of contact lenses because it has required a "break in" period varying in length of time with the particular individual. Some people whose corneas have not been readily adaptable to the contact lens have required very long periods of "break in" and in some cases have not been able to adapt themselves at all to corneal contact lenses because of this problem.

On the other hand, attempts to make a softer contact lens have not been entirely satisfactory because softer material usually has also been more fragile and is more readily scratched or broken when subjected to normal usage.

Conventional contact lenses have tended to inhibit the normal metabolism of the cornea by interfering with the flow of liquids to and from the surface of the eyeball and by interfering with the release of carbon dioxide from the surface of the cornea and the supply of oxygen to such surface. When the oxygen supplied to the cornea is reduced for a long period of time as by continuous wearing of conventional contact lenses, the cornea may become edemous thereby adversely affecting its transparency and efficiency. Moreover, the interference with the flow of fluids outwardly and/or inwardly may cause the epithilium to wrinkle or form craters, and may cause gas bubbles to collect under the lens, either or both of which, of course, would impede vision.

In many cases, of course, on the other hand, it is highly desirable for the wearer to be able to maintain his contact lenses in place for long periods of time. Accordingly, it would be very desirable to have a contact lens material which would combine all of the attributes of softness (thereby avoiding abrasion of the surface of the cornea) good optical qualities such as clarity and integrity, and ability to transmit liquids and gases. It also should withstand scratching, tearing, etc. in normal usage and should be machinable in order to be made in the form of a contact lens. Molding, of course, can be used to simplify some of the steps of the formation of the lens shape, but in some instances it is desirable to machine at least the outer edges of the lens in order that it may be tapered so as to resist movement on the cornea or avoid discomfort which otherwise might be caused by movement of the eye lids.

Important criteria for contact lens material include therefore:

1. Optical properties. This includes clarity and structural integrity which means the ability of the lens to replicate its shape and optical surface configuration from the unhydrated state to the hydrated state without distortion. Vision and acuity should remain constant. The lens should not change its optical characteristics on the eye.

2. Ability to transmit fluids. This should include both any fluids exuded from the surface of the eye and the transmission of tears from the outer surface inwardly toward the eyeball surface. Drying of the outside surface of the lens tends to cause fogging, thereby impairing vision.

3. Machinability. This includes ability to be fabricated and polished. As noted elsewhere in the present specification, although the lens may be molded, it is preferred to machine the edges so that they taper and thereby have minimal tendency to be felt when in their position on the eye when the eyelids are moved.

4. Physical durability. The lens should withstand scratching, tearing or splitting in the normal usage and preferably even in abnormal usage.

Accordingly, an object of the present invention is to prepare such a plastic or polymeric material for use in contact lenses, and to prepare contact lenses from such material.

In the manufacture of dental liners and other prosthetic devices, one of the problems has been that materials heretofore available were hard and not readily adapted to be worn in direct contact with the body. Thus, they have caused irritation to the wearer in the area of contact between the device and the body. The absorption and transmission of moisture is also a desirable characteristic of such materials. Accordingly, another object of the invention is to obtain material which can be more easily worn in contact with the body with a minimum of irritation or discomfort. The lens preferably also rides on a tear layer in the cornea, and can be readily removed at any time, i.e., it does not stick to the eye. It should also dry slowly so as to allow time to the wearer to place it on the eye. It should retain its shape upon drying and hardening.

Another object is to obtain a material which can also be readily secured to plastic materials used in such prosthetic devices so as to form a layer on the device adapted to contact the body.

Intrauterine devices (I.U.D.) have been proposed for the insertion into the uterus as a birth control measure or as a means for introducing spermicides or medications. Such devices, however, have frequently had a tendency to be rejected by the body for one reason or another, frequently because of the hardness of the material and its dissimilarity to the consistency of the surrounding body tissues. It has also been found that in a high percentage of the cases the insertion of the I.U.D. causes an inordinant amount of bleeding and therefore cannot be tolerated at all. The capacity of such inserts to absorb and transmit water is also important.

Accordingly, another object of the invention is to obtain material which is suitable for use as an I.U.D.

Still another object of the invention is to provide material suitable for windshields or eyeshields which have minimum or no tendency to fog up during use.

Still another object is to provide material useful as a dialysis membrane.

In accordance with the present invention, plastic polymeric material suitable for contact lenses and other articles is made and the foregoing objects are realized by reacting under polymerization conditions a monomer having the formula

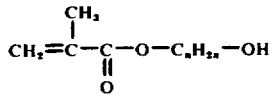

wherein n is 2 or 3 together with polyvinyl pyrrolidone, or a vinyl pyrrolidone/vinyl acetate copolymer. The monomer which has been found to produce especially desirable plastics is hydroxyethyl methacrylate (n=2). The polymerization is continued until it is substantially complete and until the polymeric material formed is water-insoluble.

Referring to the drawings:

FIG. 1 shows a type of contact lens which may be made from my plastic polymeric material;

FIG. 1A is a graph which describes the performance of the material during and after repeated washings;

Figure 2:
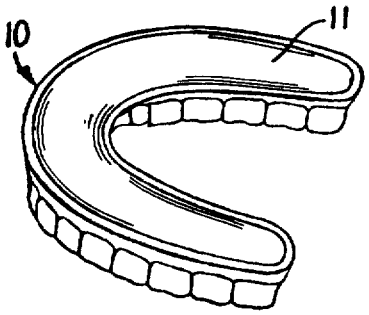
FIG. 2 illustrates the manufacture of a denture liner.

In carrying out the polymerization, a catalyst or polymerization initiator is added in a small amount. These materials are well known in the field and include those, such as di-secondary butyl peroxy dicarbonate, or benzoyl peroxide or similar types of catalysts or initiators. The di-secondary butyl peroxy dicarbonate which is sold under the trademark Lupersol 225 is preferred because it brings about the desired reaction when used in very small amounts and produces a highly desirable product. Other suitable catalysts include di-tertiary butyl peroxide, di-isopropyl peroxydicarbonate and azoisobutyronitrile.

In the case of polyvinyl pyrrolidone (PVP) the amount of PVP may vary over a rather wide range from about 1 to 70 percent by weight based on the combined weights of PVP and hydroxy alkyl methacrylate. The types of PVP also vary depending principally upon degree of polymerization or average molecular weight. For example, the products of General Aniline & Film Corporation may be used. They vary from an average molecular weight of about 10,000 (PVP K-15, an off-white powder) to about 360,000 (PVP K-90 also an off-white powder). The characteristics and specifications of the various materials are described in literature available from the manufacturer. As will appear hereinafter, the procedure preferably used according to the present invention is to dissolve with PVP in the monomeric hydroxyalkyl methacrylate and thereafter cause the graft polymerization to take place.

The high molecular weight PVP, of course, will produce more viscous solution and accordingly may present some problems in the handling of the material. Similarly, larger amounts of PVP dissolved in the monomeric hydroxyalkyl methacrylate will tend to cause higher viscosities of the resulting solutions. Such being the case, the preferred materials are those having molecular weights of about 10,000 to 160,000 and the preferred amounts of PVP are in the range of about 10 to about 50 percent consistent with satisfactorily low viscosity of the solution to afford manageability thereof.

As an alternative to PVP, as indicated, there may be used copolymers of vinylpyrrolidone with vinylacetate also available from General Aniline & Film Corporation as a basis for the graft polymerization with the hydroxyalkyl methacrylate. These materials may vary in the proportion of vinylpyrrolidone/vinylacetate over a rather wide range, for instance, from about 25/75 to 75/25, and the amount thereof in proportion to the hydroxyalkyl methacrylate is substantially the same as in the case of the PVP.

The polymerization is carried out under normal polymerization temperatures, suitably about 40° to about 65° C. Preferably subsequent to the initial polymerization step, the polymer is heated at a somewhat higher temperature of about 70° to about 110° C. to bring about the polymerization of any unpolymerized material which may be present, or to complete the polymerization of potentially polymerizable material. This step also serves the purpose of relieving any internal strains that may exist within the polymer. It is preferably removed from the receptacle in which the initial polymerization is carried out and placed upon an aluminum foil sheet or similar support and inserted into an oven at a temperature of about 100° C. or suitably within the range of about 90° to about 110° C. It may be allowed to remain in the postcuring oven for about 10 hrs. although a shorter period of time may suffice and a longer period of time will do no particular harm.

After the polymerization is substantially complete, the polymeric plastic material is ready to be cut or machined into the form of the final contact lens. It is feasible, of course, to mold the lens in substantially its final shape. Machining, grinding and/or casting is done in a manner known per se in order to obtain a lens having a surface suitable for its optical function. As indicated previously it is preferred to machine the outer edges of the lens to a tapered shape so that they are more compatible with the eyeball and permit the lens to retain its position on the cornea without being displaced by movement of the eye lids. Such tapering also improves the comfort of the wearer.

In forming the lens, allowance is made for the fact that upon hydration it will expand to a considerable extent. The lens, for instance, made in accordance with the examples will expand about 30–50 percent indicating a porosity (microporosity) of about 30–50 percent. The percent expansion will vary depending upon the composition of the monomer mixture. It is predictable and constant, however, and accordingly appropriate allowance is made for the amount of expansion in accordance with known techniques depending upon what the particular degree of expansion is.

It is important for the purpose of the present invention to treat the lens to remove from its interstices any acidic condition which may be present there, otherwise acidic material migrating from the lens may irritate the eyeball. Accordingly, the lens material is washed in a dilute alkali, suitably at a pH of about 9–10 to neutralize such acid condition. Preferably, the dilute alkaline solution is made isotonic by the addition of appropriate amounts of salt.

After the neutralization step, it is then desirable to place the lens in a condition in which it is compatible with the surface of the eye. It is, therefore, treated in a normal saline or isotonic solution, this may be done by boiling the lens in normal saline or isotonic solution for a short period of time, such as about 15 min.

The following examples are to illustrate the invention.

EXAMPLE 1

Eighty parts by weight of commercially available hydroxyethyl methacrylate (HEMA) containing a small amount 1–2 percent by weight of methacrylic acid, are mixed with 20 parts by weight of polyvinylpyrrolidone (PVP) sold by General Aniline & Film Corporation and under the designation PVP K–15, and 0.2 parts Lupersol 225 (di-secondary butyl peroxy dicarbonate). The PVP was an off-white powder having a K value (a measure of molecular weight) in the range of 15–21 and an average molecular weight of about 10,000. It had a maximum unsaturation of 1 percent calculated as monomer and a bulk density of about 36 lbs. per cu. ft. The PVP was heated to eliminate any moisture before use. After dissolving of the PVP in the HEMA, the liquid mixture is poured into a standard size polyethylene tube having an inside diameter of one-half in., the lower end of the tube being closed by a silicone rubber stopper. The polyethylene tube is inserted into a standard size three-fourth in. acrylonitrile-butadiene-styrene pipe to support the polyethylene tube. The upper end of the polyethylene tube is closed with another stopper to exclude foreign matter. The polyethylene tube containing the mixture described above is then inserted into an oven maintained at 45° C. for 2.5 hrs. The time of treatment in the oven may be extended for an additional 8 hrs. at 70° C. to make certain that polymerization has taken place to the desired extent and a solid rod has been produced. This postcuring tends to make the material somewhat stronger but is not essential for its intended function. Alternatively, the postcuring is carried out as follows: The polymerized mass is removed from the oven, the polyethylene tube removed from the supporting pipe, and the polyethylene is slit and stripped off of the polymerized HEMA/PVP graft polymer contained therein. The polymer is then placed on a supporting aluminum foil sheet and inserted into another oven and maintained at a temperature of 70° C. and postcured for about 8 hrs. The polymerized HEMA/PVP is next cut and machined to the desired shape of a contact lens 2 shown in FIG. 1 having the usual convex outer surface 3 and concave inner surface 4 and preferably tapered edges 5 to minimize any tendency toward irritation by movement of the eyelid. The outside diameter of the lens is about 0.420 inch. After machining, the lens is immersed in a dilute alkaline solution, suitably sodium bicarbonate having a pH of about 9–10. It is held in the sodium bicarbonate solution at about 85° C. for 15 minutes. By this time the lens has become completely hydrated and any acid condition which existed in the lens has been neutralized. The lens is next removed from the sodium bicarbonate and inserted into a boiling normal or isotonic saline solution (about 0.9 percent sodium chloride). In this way the excess alkali retained in the lens from the alkaline solution is replaced with normal saline and the lens is completely compatible with the fluids in the eye. By using the saline instead of water for the post treatment undue expansion which would be caused by ordinary water is avoided and the lens assumes the desired size and configuration. Such expansion would be caused by the osmotic pressure exerted by the salt within the lens, as compared with the much lower concentration in the water surrounding the lens.

When using the lens, it is also important that the lens has been previously saturated with isotonic or normal saline solution in order to provide the compatability with the eye fluids, so that the lens does not destroy the tear layer and can position itself properly in the center of the eye.

The lens prepared by this example has excellent optical properties including clarity, integrity of form and surface characteristics, and freedom from distortion. The index of refraction of the material is also very suitable for a contact lens. The vision and acuity remain constant. There is no significant change in shape or tendency for the lens to change its position on the eye. The lens also has the ability to transmit fluids from the surface of the eyeball outwardly, or inwardly toward the eyeball. The polymer made by the procedure of this example also has excellent machinability and ability to be polished. As noted above, this is important from the standpoint of the need to taper the edges of the lens by machining to impart adaptability to the movement of the eyelids. The lenses made in accordance with this procedure also withstand and resist scratching and tearing in normal usage.

An extraction procedure as carried out on the finished graft polymer. It was immersed in boiling water for a period of 1 week and thereafter dried in an oven at 70° C. for 3 days. The following table presents the weight of the material during the various stages of the treatment.

| | |
|---|---|
| Dry weight originally | 1.454 g. |
| Water saturated weight after one week in boiling water | 2.618 |
| Sample dried in oven at 70° C | |
| for 1 day | 1.513 |
| for 2 days | 1.420 |
| for 3 days | 1.406 |
| for 4 days | 1.400 |
| for 5 days | 1.395 |
| for 6 days | 1.393 |
| Total weight loss | 1.454–1.393 = 0.061 g. |

The material dehydrated in the above procedure was again rehydrated in boiling water, after which treatment it had attained a hydrated weight of 2.623 gm. It was then redried in accordance with the procedure described above. After the fourth day of drying it had attained weight of 1.383 gm.

The data on hydration and drying are presented in FIG. 1A, in which the curve 1 represents the weight of the sample during the first drying cycle, and curve 2 the weight during the second drying cycle, the ordinate being the weight in grams and the abscissa being the drying time in days. Since the weight loss which is an indication of extracted material constitutes but a small percentage of the original weight, it is apparent that almost all of the PVP in the graft copolymer is not extractable in spite of the fact that the original PVP was highly water soluble. It is believed, therefore, that polymerization of HEMA took place with chain transfer to the PVP and resulted in a graft copolymer.

EXAMPLE 2

Following generally the procedures described in example 1, a series of graft polymers are made from PVP and HEMA by dissolving PVP (General Aniline and Film's K-30) in HEMA. PVP K-30 is an off-white powder having a K value of 26–35 and an average molecular weight of about 40,000. It has maximum unsaturation (calculated as monomer) of about 1 percent and a bulk density of about 28 lbs. per cu. ft. The proportion of PVP to HEMA varied from 1/19 to 6.5/3.5. All the formations are heated to 45° C. for 3 hrs. to effect polymerization and thereafter postcured at 70° C. for 8 hrs. The amount of Lupersol 225 used is about 0.002 parts by weight per 10 parts of mixture of HEMA with PVP. The proportions of the different ingredients used for the respective graft polymers are set forth in the following table.

TABLE I

[Parts by weight]

| | | | | | | | | | | | | | |
|---|---|---|---|---|---|---|---|---|---|---|---|---|---|
| GAF's PVP K-30 | 1 | 1 | 1.5 | 2 | 2.5 | 3 | 3.5 | 4 | 4.5 | 5 | 5.5 | 6 | 6.5 |
| HEMA | 19 | 9 | 8.5 | 8 | 7.5 | 7 | 6.5 | 6 | 5.5 | 5 | 4.5 | 4 | 3.5 |
| Lupersol 225 | .002 | .002 | .002 | .002 | .022 | .002 | .002 | .002 | .022 | .002 | .002 | .002 | .002 |

All of these products are satisfactory for use in the manufacture of contact lenses. In the range, however, of 4/6 to 6.5/3.5 PVP/HEMA the solution is rather viscous and can be handled most expeditiously by passing the mixture through rolls in order to produce adequate dispersion and solution of the PVP.

In forming whatever article is desired, such as a contact lens, allowance is made for the fact that upon hydration the material will expand considerably. It may, for instance, expand from 30 to 60 percent of its dimensions while dry. The degree of expansion may vary depending upon the composition of the monomer mixture. It is predictable and constant, however, and hence is accounted for employing known techniques depending upon what the particular degree of expansion is. The following table is presented to show the expansion of the hydrated material based upon the dimensions of the unhydrated material for several of the polymers described in table I.

Table II

| | | | |
|---|---|---|---|
| Percent PVP | 25% | 20% | 10% |
| PVP K-30 | 2.5 | 2 | 1 |
| HEMA | 7.5 | 8 | 9 |
| Lupersol 225 | 0.002 | 0.002 | 0.002 |
| Expansion (Hyd.) | 47% | 50% | 53% |

After the polymerization is substantially complete, the polymeric plastic material is ready to be cut or machined into the form of the contact lens or whatever other desired object is to be made. It is feasible, of course, to mold the article in substantially its final shape. Machining, grinding and/or casting is done in a manner known per se in order to obtain a lens having the desired optical function. As indicated previously, it is preferred to machine the outer edges of the lens to a tapered shape so that they are more compatible with the eyeball and permit the lens to retain its position on the cornea without being displaced by movements of the eyelids.

It is possible also to incorporate small amounts of additives to improve the machinability of the polymerized plastic material. It is important, however, in the case of lenses to avoid the use of excessive amounts of such other additives because such excessive amounts tend to cause a loss in optical properties, strength, resistance to abrasion, scratching, tearing, etc. which the preferred material has. Such additives include, for example, cellulose acetate, (Eastman Kodak's E-39-8-10) in the amount, for example, of about 2 parts by weight per 90 parts HEMA/PVP. The alkyl methacrylates described in my copending application Ser. No. 713,998 filed Mar. 18, 1968 also improve machinability and may be added without detracting significantly from the properties of the lenses.

It is significant also that water itself tends to soften or plasticize the material. Hence, instead of using one of the additives just mentioned, which may be incorporated for the purpose of rendering the material more machinable, one may merely introduce a small amount of water into the polymer as, for example, by maintaining the polymer in an environment having the proper humidity. Higher relative humidities ordinarily encountered in the atmosphere will, for example, effect appreciable softening of the polymer.

Interesting properties were observed in the graft polymer prepared from 20 parts PVP and 80 parts HEMA (described in this example) and polymerized in a mold having substantially the curve of the contact lens, for example, one mold convex forming the concave lens surface and the convex lens surface formed by machining and/or grinding. Such contact lens it was found had the characteristic of correcting astigmatism as well as myopia. Such characteristics can be obtained over the range of about 5/95 to 30/70 preferably 15/85 to 25/75 PVP/HEMA employing as the base polymer, PVP having molecular weight from about 20,000 to 60,000.

EXAMPLE 3

Thirty parts by weight of polyvinylpyrrolidone/vinylacetate copolymer (General Aniline & Film's S-630) are dissolved in 70 parts HEMA together with 0.2 parts Lupersol 225 and are polymerized substantially in accordance with the procedure described in Example 1 for 2.5 hrs. at 40° C. The PVP/VA copolymer has a ratio of 60/40 vinylpyrrolidone/vinylacetate. It has a K value (1 percent ethanol solution) of 30–50 and a specific gravity (25° C.) of 1.27±0.01 as determined on molten product. The final HEMA-PVP/VA graft polymer is suitable for the manufacture of contact lenses.

Measurements were made of the expansion upon hydration for several materials prepared in accordance with this example varying in the proportions of PVP/VA to HEMA. The results are presented in the following table.

TABLE III

| | | | |
|---|---|---|---|
| Percent PVP/VA | 20% | 10% | 5% |
| PVP/VA 5630 | 2 | 1 | 5 |
| HEMA | 8 | 9 | 9.5 |
| Lupersol 225 | 0.002 | 0.002 | 0.002 |
| Expansion (Hyd.) | 38% | 42% | 43% |

It will be noted that the expansion upon hydration (based upon the unhydrated material) varied from 38 percent to 43 percent, the greater degree of hydration being found with the graft polymer containing the lesser amounts of PVP/VA.

EXAMPLE 4

Ten parts by weight of PVP/VA (General Aniline & Film's I-335) are dissolved in 90 parts HEMA together with 0.2 parts Lupersol 225 and polymerization is carried out substantially in accordance with Example 1 for 2.5 hrs. at 40° C. the PVP/VA is formed from a monomer in the ratio of 30/70 vinyl pyrrolidone/vinyl acetate. It has a K value (1 percent ethanol solution) of 20–30 and a specific gravity (25° C.) of 0.955±0.01. The final graft polymer is suitable for the manufacture of contact lenses.

Figure 4:
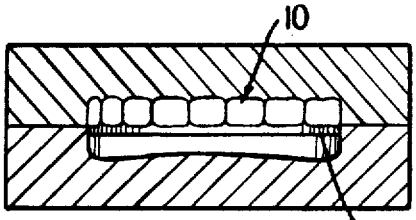
FIG. 4 shows a further step in the adaptation of the denture to the use of my material.
Figure 3:
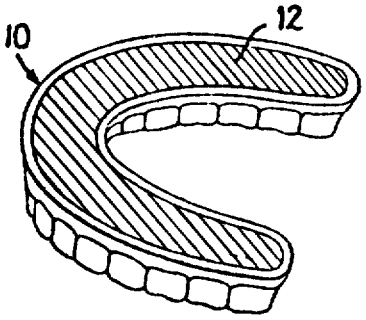
FIG. 3 illustrates the adaptation of a denture to the use of my polymeric material.

With regard to the use of my polymeric material as a liner for dentures, there are different approaches which may be used. One would involve the manufacture of an acrylic denture indicated in FIG. 2, using standard casting procedures and materials. The denture 10 is cast or molded in accordance with known procedures so that the surface 11 conforms to the roof of the patient's mouth. A similar mating denture, of course, would also be made for the lower jaw. It is only necessary for the dental technician to grind away sections 12 as shown in FIG. 3 from the finished hard denture where he desires to have the liner of my soft polymeric material. After removal of these sections, the denture is placed back into the mold as indicated in FIG. 4 and my polymeric material is inserted into the mold in the groundaway areas 12 in paste or liquid form so that it fills the areas 12 that have been previously ground away, thereby reforming the configuration of the original denture 10. Since the polymeric material will adhere and become an integral part of the acrylic denture, the swelling which results from the hydration will not cause it to break free from the hard acrylic material.

Dentures are generally hydrated before they are inserted into the mouth, thereby softening the sections containing my polymeric material. In usage, the denture is maintained wet and upon removal from the mouth is generally placed in water so that the polymeric liner would always remain hydrated.

The advantages of dentures containing my material are better fit and comfort and better adherence to the mouth surface. Whereas a hard denture liner forces the gums to conform to its configuration, the addition of my polymeric liner allows the denture to conform to the configuration of the gums.

Figure 5:
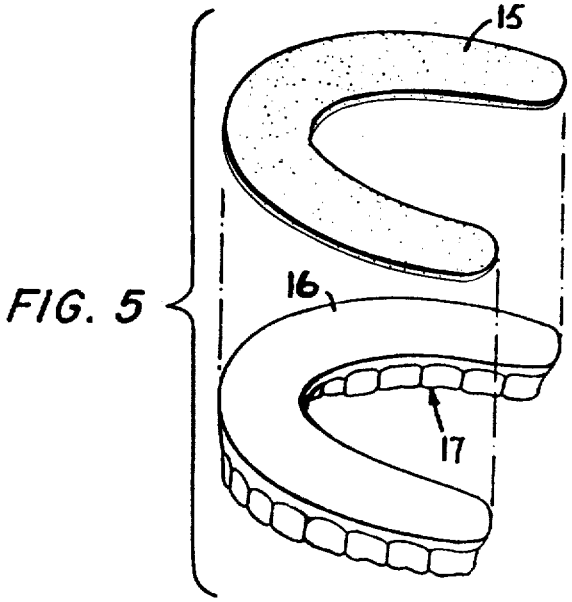
FIG. 5 illustrates another adaptation of my material to dentures.

In still another adaptation of my material which is shown in FIG. 5, a thin layer 15 of polymeric material is molded or cut to conform generally to the gum contacting surface 16 of a standard denture 17. This thin layer 15 may be, for example, one-sixteenth inch thick. Once the thin layer has been hydrated as described herein it will conform to the gum-contacting surface of the denture and with the gums themselves thereby improving the fit and comfort.

Figure 7:
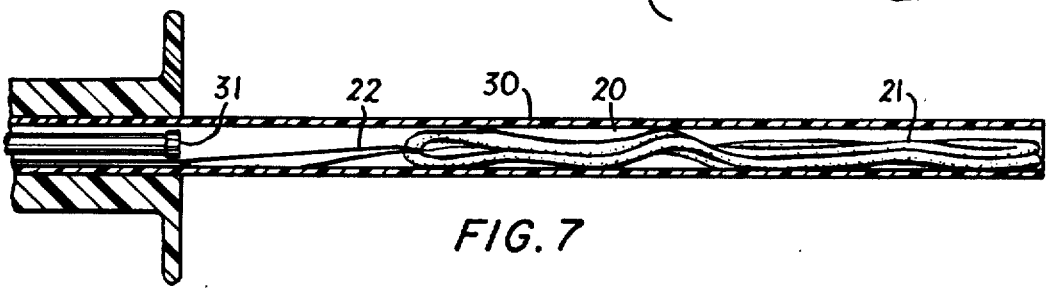
FIG. 7 illustrates the manner and means for insertion of such an intrauterine device.
Figure 6A:
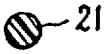
FIG. 6A is a cross section of the device shown in FIG. 6 taken on the plane A—A and looking in the direction of the arrows.
Figure 6:
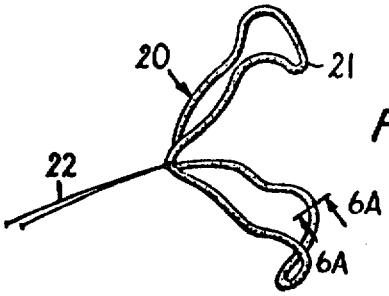
FIG. 6 shows an intrauterine device made from my polymeric material.

The adaptation of my polymeric material to I.U.D.'s is shown in FIGS. 6, 6A and 7. The device is indicated generally at 20 in FIG. 6 and consists of a body portion 21 and an appended string such as a nylon string 22. Its sinuous shape is adapted to permit it to be retained within the uterus although other shapes, of course, may be used, such as a coil. It is inserted through the vagina by employing a tube 30 as shown in FIG. 7, which may be made of plastic material fitted with a plunger 31 also suitably made of plastic. The device 20 is confined within the tube 30 and will be inserted into the uterus through the cervix by actuating the plunger 31, whereupon the device will assume the configuration illustrated in FIG. 6. The string 22 permits removal when desired.

To manufacture the device, it is suitably molded employing conventional procedures, the nylon string, of course, being inserted prior to the molding operation so as to be integral with the device. The polymeric material contemplated for I.U.D.'s would be much softer and more rubbery than the material employed for contact lenses. The addition of 5–10 percent of such plasticizing agents as glycerine or Carbowax of the lower molecular weight range, hydroxyethyl acetate, butyl acrylate and like materials to any of the polymeric materials described herein will convert such formulations to a soft and pliable material even in the unhydrated state. Upon hydration such materials tend to become much softer. Such softness facilitates insertion into the uterus and removal from the uterus and will minimize the bleeding problem thereby making it more acceptable for a greater number of women. The smaller size in the unhydrated state also makes my I.U.D's more easily inserted. The problem also referred to above of the tendency of the uterus to expel the I.U.D. as a result of natural body movements is also minimized with my polymeric material, since they are softer and more flexible.

Moreover, it is possible to incorporate various materials into my polymeric material at the time the material is formulated. The addition of a quaternary compound, for example, in powder form, would be compatible with my polymeric material both in unpolymerized and polymerized states and would be uniformly dispersed throughout the mass of the I.U.D. in finished form. Subsequently, when body fluids are absorbed into the polymeric material they will dissolve the quaternary material and eventually leach it to the outer surface where it will come into contact with the normal body fluids found in the uterus. The result is to provide spermicidal action as well as a deodorant and germicidal function. More important, however, is the capacity of the I.U.D. to soften upon hydration making it easier to insert and engender less of a foreign body reaction, thereby making it physiologically more acceptable.

In employing my polymeric material as a nonfogging laminate for windshields, ski glasses and the like, it is laminated using conventional procedures, to glass or other plastic. Most suitably the layer to which it is laminated is an acrylic type polymer so that it bonds very well to the basic material. Since my polymeric material absorbs moisture, it will have minimum tendency or no tendency to fog up due to high humidity conditions, particularly those prevailing on the body side of the eyeglass or on the interior of the windshield.

I claim:

1. A water-insoluble polymeric material, which material is swellable in water to a limited extent, consisting essentially of a monomer having the formula

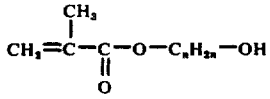

wherein n is 2 or 3 graft polymerized upon about 1 to 70 percent by weight of polyvinylpyrrolidone or of vinylpyrrolidone-vinylacetate copolymer.

2. A polymeric material as described in claim 1 wherein the value of small n is 2.

3. A polymeric material as described in claim 1 wherein the amount of polyvinylpyrrolidone or of said copolymer is about 10 to 50 percent.

4. A polymeric material as described in claim 1 wherein said monomer is graft copolymerized with polyvinylpyrrolidone.

5. A polymeric material as described in claim 1 wherein said monomer is graft copolymerized with said vinyl copolymer.

6. A polymeric material as described in claim 1 wherein the molecular weight of the polyvinylpyrrolidone or copolymer is about 10,000 to 160,000.

7. A polymeric material as described in claim 5 wherein the polyvinyl copolymer has a ratio of polyvinylpyrrolidone and vinyl acetate of about 25/75 to about 75/25.

8. A polymeric material as described in claim 1 wherein the monomer has the formula described in which n is 2, the polyvinylpyrrolidone having molecular weight from about 20,000 to 60,000 is used as the basis for graft polymerization and the amount of polyvinylpyrrolidone is about from 5 to 30 percent by weight.

9. A contact lens made from the polymeric material described in claim 1.

10. A dental prosthetic device having as a liner adapted to contact the body, material described in claim 1.

11. An intrauterine device constructed of polymeric material described in claim 1.

* * * * *